(12) United States Patent
Marmalich

(10) Patent No.: US 6,254,951 B1
(45) Date of Patent: *Jul. 3, 2001

(54) FLEXIBLE WOOD FABRIC AND METHOD OF MANUFACTURE

(76) Inventor: Thomas A. Marmalich, 940 Oakmound Ave., Newbury Park, CA (US) 91320

( * ) Notice: Subject to any disclaimer, the term of this patent is extended or adjusted under 35 U.S.C. 154(b) by 0 days.

This patent is subject to a terminal disclaimer.

(21) Appl. No.: 08/313,424

(22) Filed: Sep. 27, 1994

(51) Int. Cl.[7] ....................................... B32B 21/04
(52) U.S. Cl. ..................... 428/40; 144/329; 144/332; 428/50; 428/105; 428/106; 428/187; 428/321.1; 428/322.2; 428/537.1; 428/542
(58) Field of Search ................ 428/40, 50, 187, 428/321.1, 322.2, 106, 105, 537.1, 541; 144/329, 332

(56) References Cited

U.S. PATENT DOCUMENTS

| 327,549 | * | 10/1885 | Harwood | 428/106 |
| 3,837,634 | * | 9/1974 | Cobb | 428/114 |
| 4,668,324 | * | 5/1987 | Burns | 428/106 |

* cited by examiner

*Primary Examiner*—Nasser Ahmad
(74) *Attorney, Agent, or Firm*—Robert M. Sperry

(57) ABSTRACT

An improved method of treating wood comprising treating a sheet of wood veneer with a conventional stress relieving process, saturating the treated veneer with oil and sealing the saturated veneer to retain the entrained oil. It is found that this treatment renders the veneers significantly more flexible, with radii of approximately 1/16 inch, and allows wood veneers to be used informing hinges, wallets, purses, draperies, shoes, clothing and other products which could not previously be made from wood, together with a plurality of products made with this process.

4 Claims, 2 Drawing Sheets

FLEXIBLE WOOD FABRIC AND METHOD OF MANUFACTURE

FIELD OF THE INVENTION

This invention relates to wood processing and is particularly directed to an improved method of processing wood veneer to provide a highly flexible product which can be used as a fabric and to products produced by this method.

PRIOR ART

Wood working and forming are among the oldest of the useful arts and the bending of wood has always presented challenges to workers. Thousands of years ago, workmen learned to use soaking and heat to bend timbers for shipbuilding and architecture. Later, similar techniques were used to bend smaller boards for making furniture and the like. More recently, it has been found that thin sheets or veneers of wood could be bent more easily to fit around curves for interior decoration of automobiles and the like. Also, the use of such thin veneers allowed furniture makers, model builders and the like to use less valuable woods for structural purposes and to cover the structural wood with veneers of rarer or more expensive woods for appearance. Unfortunately, such veneers are quite brittle and, even with very thin veneers, the radius of curvature which can be achieved is quite limited. Efforts to form sharper corners causes splitting or splintering of the veneer, which creates sharp, uneven and unsightly edges and which can produce painful injury to persons brushing against such edges. Numerous prior art attempts have been made to overcome these limitations. Thus, when processing veneers to thicknesses in the range of $1/32-1/64$ inch, it has become common practice to apply a rigid backing material, such as wood fiber paper or multiple plys of paper, foil, fabric or the like, in order to maintain structural integrity. A mechanical process called "stress relieving" has also been employed to significantly reduce the natural brittleness of the veneers and backing. However, even when this process is used, it is satisfactory only when the veneer is atttached to a rigid or "stable" substrate or surface, such as walls, furniture and the like. Thus, even when treated with the "stress relieving" process, the resulting veneer is still extremely brittle when compared to cloth, leather and other fabrics and is unsatisfactory where mechanical movement of the substrate is desired. Thus, none of the prior art wood softening processes have been entirely satisfactory.

BRIEF SUMMARY AND OBJECTS OF INVENTION

These disadvantages of the prior art are overcome with the present invention and an improved method of processing wood veneers is provided which renders the veneer comparable with cloth, leather and other fabrics in flexibility, permitting application to an unstable substrate which is subject to mechanical movement and, thus, permits the use of wood in producing a wide variety of products which could not, heretofore, be produced from wood.

The advantages of the present invention are preferably attained by providing an improved wood treatment method comprising treating a sheet of wood veneer with a conventional stress relieving process, Pre-treating the sheet with glycerine, saturating the treated veneer with oil and sealing the saturated veneer to retain the entrained oil. It is found that this treatment renders the veneers significantly more flexible, with the ability to be attached to an unstable substrate which is subject to mechanical movement, and allows wood veneers to be used in forming hinges, wallets, purses, draperies, shoes, clothing and other products which could not previously be made from wood.

Accordingly, it is an object of the present invention to provide an improved method of treating wood.

Another object of the present invention to provide an improved method of treating wood which renders the wood significantly more flexible whilt maintaining its structural integrity when attached to an unstable substrate which is subject to mechanical movement.

An additional object of the present invention is to provide an improved method of treating wood to produce a wood fabric having sufficient flexibility and structural integrity to permit attachment to an unstable substrate for mechanical movement.

A further object of the present invention to provide an improved method of treating wood which allows the use of wood to produce a wide variety of products which could not previously be made from wood.

Another object of the present invention to provide an improved method of treating wood which provide wood veneers with flexibility comparable with cloth, leather and other fabrics.

An additional object of the present invention is to provide a plurality of products made from wood which could not previously be made from wood.

A specific object of the present invention to provide an improved method of treating wood comprising treating a sheet of wood veneer with a conventional stress relieving process, saturating, then, treating the veneer with oil and sealing the saturated veneer to retain the entrained oil. It is found that this treatment renders the veneers sufficiently flexible to maintain structural integrity of the veneer when undergoing mechanical movement to allow wood veneers to be used in forming hinges, wallets, purses, draperies, shoes, clothing and other products which could not previously be made from wood, together with a plurality of products made with this process.

These and other objects and features of the present invention will be apparent from the following detailed description, taken with reference to the figures of the accompanying drawing.

DETAILED DESCRIPTION OF THE INVENTION

Figure 1:
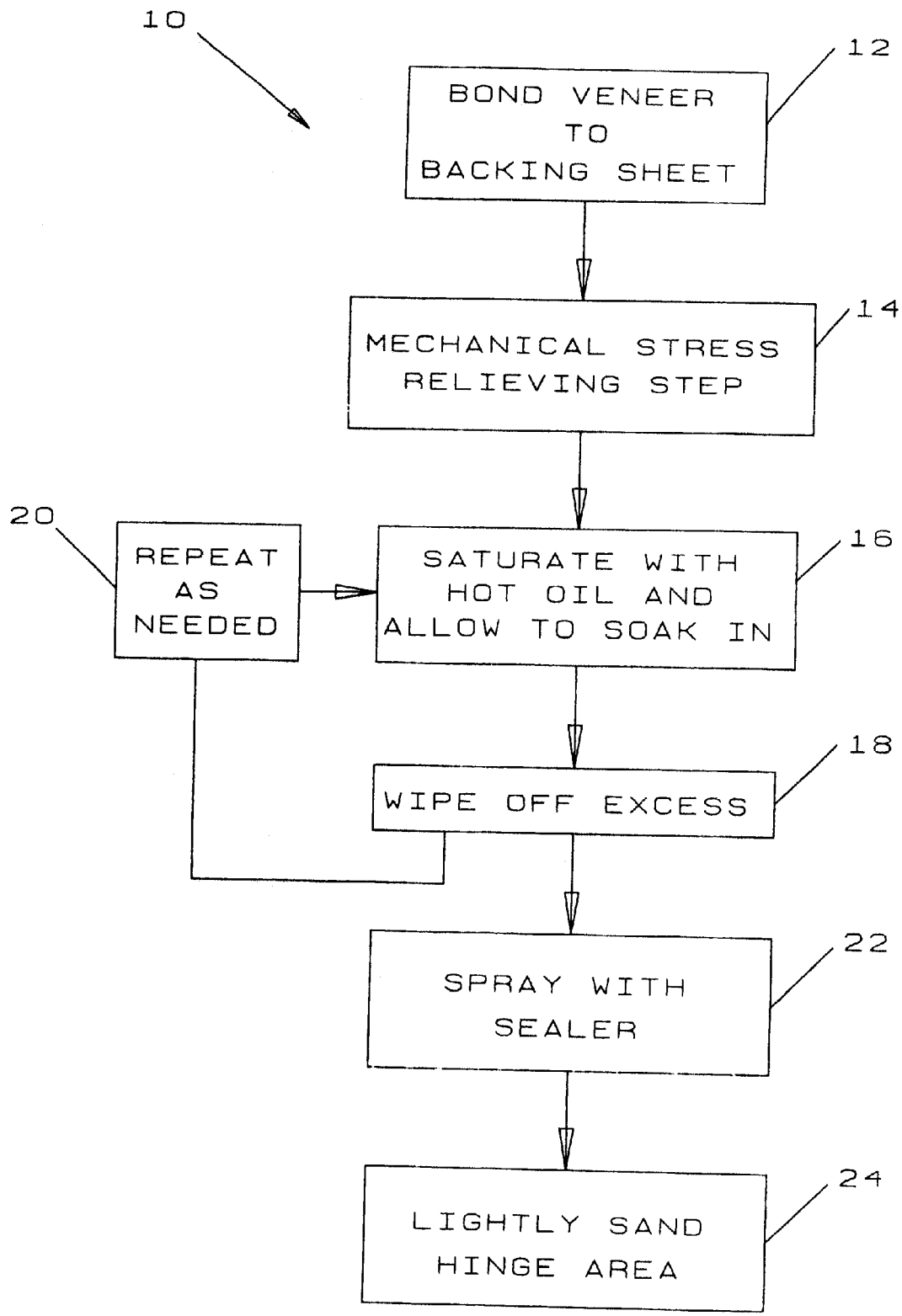
FIG. 1 is a flow diagram show the wood treatment process embodying the present invention for making highly flexible wood fabric.

In that form of the present invention chosen for purposes of illustration, FIG. 1 is a flow diagram, indicated generally at 10, showing the steps involved in producing highly flexible wood fabric and products made using this fabric. As seen in step 12 of FIG. 1, a thin sheet of wood veneer, preferably having a thickness in the range of approximately $1/32-1/75$ inch, is bonded to a backing sheet formed of suitable material, such as paper, paper and foil, paper and fabric and the like, using appropriate heat and pressure. As is well known in the veneer-making art, the specific heat and pressure will vary depending upon the specific type and thickness of the wood veneer and the backing material. Next, the veneer is treated with a mechanical stress relieving process, as indicated in Step 14 of FIG. 1. As is well known, Step 14 is conventional and serves to give the veneer, which was originally highly brittle, a limited degree of flexibility. This is sufficient for some automotive and furniture making or architechtural, wherein the substrate is stable and is limited to movement associated with nature, as in expansion and contraction. In contrast, with the present invention, Steps 16–24 provide significantly greater flexibility than has been possible heretofore. Thus, Step 16 requires flooding the veneer with an oil mixture having a preferred ambient temperature of 65–80° F. and comprising approximately ⅔ boiled linseed oil to ⅓ mineral spirits, and allowing this to soak into the wood channels. Thereafter, any excess of the mixture is wiped off in Step 18 and, as indicated in Step 20, Steps 14 and 18 are repeated as often as necessary until the wood channels are filled with the oil mixture. When the veneer will absorb no more of the oil mixture, it is sealed with a suitable sealant material, as indicated in Step 22. It has been found that satisfactory sealing is achieved with two coats of a dear shellac, such as that available commercially under the tradename "Bullseye", available from Wm. Zinsser Co., Inc., Somerset, N.J. If desired, a suitable wax or stain may be applied to the veneer prior to the sealing step, Step 20. A suitable material for this is an antique oil, such as that available commercially under the tradename "Minwax", available from Minwax, Co., Inc., Montvale, N.J.

Figure 2:
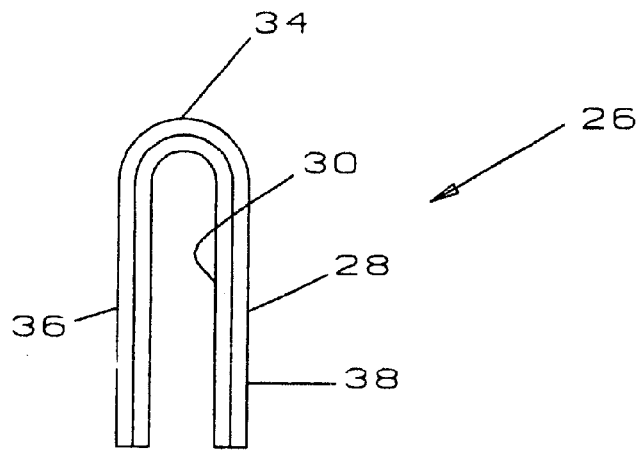
FIG. 2 is a side view of a wooden hinge made using the wood fabric produced by the wood treatment process of the present invention.
Figure 3:
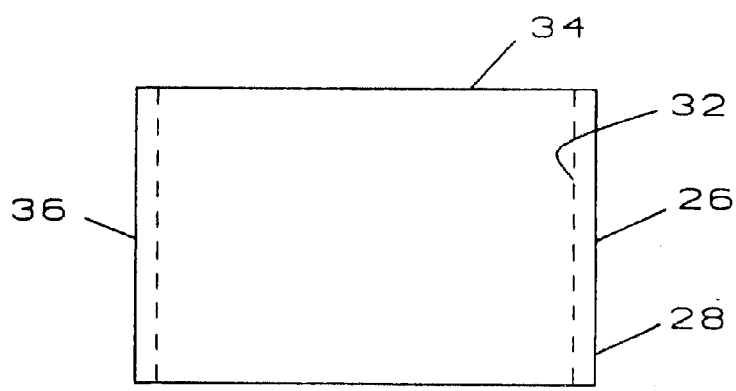
FIG. 3 is a front view of the hinge of FIG. 2.
Figure 4:
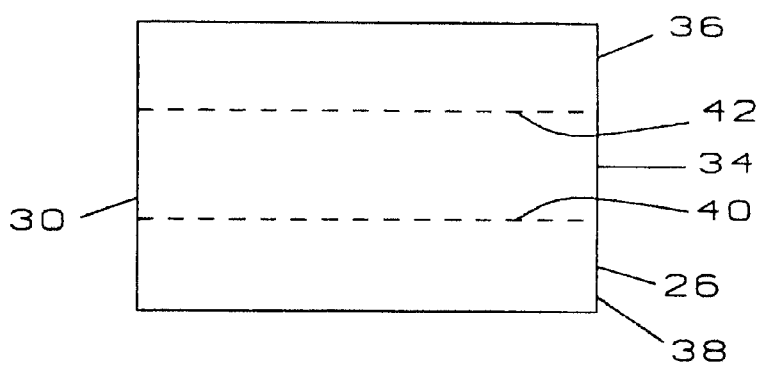
FIG. 4 is a view of the inside of an alternative form of the hinge of FIGS. 2 and 3, shown fully open.

In use, the sheet of wood veneer now has sufficient flexibility that it will maintain structural integrity while being subjected to mechanical movement of an unstable substrate to which it is attached and has a flexibility comparable with that of cloth, leather or other fabric. Thus, the wood veneer, thus treated, can be employed for making a wide variety of products which could not previously be made from wood, such as draperies, clothing, wallets, purses, shoes and the like. FIGS. 2 and 3 show a hinge, indicated generally at 26, formed of wood veneer treated in accordance with the method of FIG. 1. As shown, a sheet 28 of wood veneer, treated in the manner described above, is attached, as by sewing, adhesive or the like, to a backing sheet 30 of leather, fabric or a combination of these, as indicated by dotted line 32 in FIG. 3, and the hinge 26 is repeatedly folded and lightly creased along a desired hinge line, indicated generally at 34, which preferably extends generally parallel to the running grain of the wood of the veneer sheet 28. It has been found that substantial mechanical movement can be achieved, using an unstable substrate, such as leather, fabric or the like, without losing the structural integrity of the wood fibers or splintering of the wood veneer 28. If desired, the area of the hinge line 34 may be lightly sanded to remove any roughness and to further facilitate folding and unfolding along the hinge line 34. Thereafter, the hinge 26 may be installed, by attaching side 36 of the hinge 26 to a door, book cover or other item to be hingedly connected, while side 38 of the hinge 26 is attached to a box, door frame or other item to which the item attached to side 36 of the hinge 26 is to be connected. The sides 36 and 38 of the hinge 26 may be attached to the items to be connected by adhesives, fastening means, such as screws, or other suitable attaching means, not shown. Alternatively, if desired, one or more additional sheets 40 and 42 of leather, fabric or the like may be sewn to the backing sheet 30 to form pockets, as seen in FIG. 4. When this is done, the hinge 26 can be used as an extremely attractive and unusual card case, wallet or the like. By providing a large sheet of veneer 28 and forming a plurality of oppositely facing hinge lines, such as hinge line 34, the sheet 28 of veneer may be made to sere as window curtains, draperies, room dividers and the like.

Obviously numerous other variations and modifications can also be made without departing from the spirit of the present invention. Therefore, it should be dearly understood that the forms of the present invention described above and shown in the figures of the accompanying drawing are illustrative only and are not intended to limit the scope of the present invention.

What is claimed is:

1. An laminated, flexible article of manufacture comprising:

a sheet of wood veneer bonded to a leather backing sheet wherein the veneer sheet has been treated with a stress relieving process, saturated with linseed oil, and sealed with shellac to retain the entrained oil.

2. The article of claim 1 wherein:

said article is a hinge.

3. The article of claim 1 wherein:

said article is a card case.

4. The article of claim 1 wherein:

said article is a wallet.

* * * * *